Figure 1:
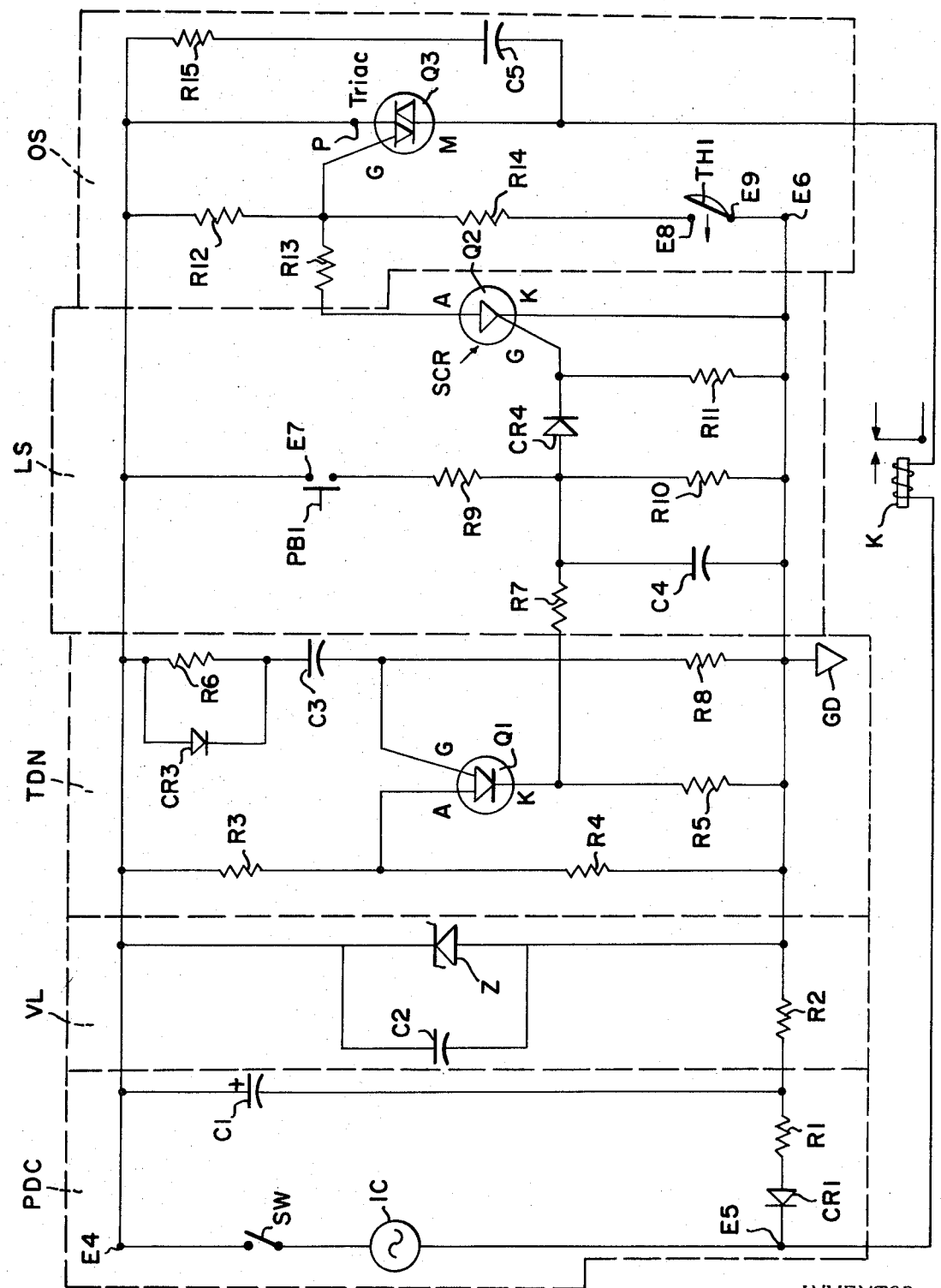

United States Patent

Granieri

[15] 3,688,130
[45] Aug. 29, 1972

[54] CONTROL SYSTEM

[72] Inventor: George J. Granieri, 203 Carlton Club Dr., Piscataway, N.J. 08854

[22] Filed: Feb. 3, 1971

[21] Appl. No.: 112,232

[52] U.S. Cl............307/252 F, 307/252 B, 307/293, 317/141 S, 317/148.5 B
[51] Int. Cl....H01h 47/32, H01h 47/18, H03k 17/28
[58] Field of Search........307/252 B, 252 F, 252 N, 252 Q, 307/252 T, 252 UA, 252 W, 246, 283, 284, 293, 301, 318; 317/148.5 B, 141 S

[56] References Cited

UNITED STATES PATENTS

| | | | |
|---|---|---|---|
| 3,584,240 | 6/1971 | Hoffman | 307/283 X |
| 3,417,296 | 12/1968 | Wallentowitz | 307/252 W X |
| 3,525,021 | 8/1970 | Engman | 317/148.5 B X |
| 3,321,641 | 5/1967 | Howell | 307/252 W |
| 3,334,243 | 8/1967 | Cooper | 307/293 |
| 3,388,347 | 6/1968 | Dinzl et al. | 307/283 X |
| 3,584,298 | 6/1971 | Kolbiaz | 307/246 X |
| 3,593,043 | 7/1971 | Shuey | 307/252 F X |

OTHER PUBLICATIONS

Spofford, " The D13T-A Programmable Unijunction Transistor," Application Note, Semiconductor Products Dept.; 90.70, 11/67 pgs. 2 & 12.

G. E. Scr Manual p. 199, 4th Edition, 3/1967.

*Primary Examiner*—Donald D. Forrer
*Assistant Examiner*—L. N. Anagnos
*Attorney*—Jefferson Ehrlich, Tennes I. Erstad and Robert G. Crooks

[57] ABSTRACT

Covers an AC power system for operating and controlling a heating system, or an air-conditioning system, or any like arrangement for supplying power and controlling the power delivered to a plurality of separate apartments or rooms of a building or to separate buildings. If the AC power is removed from all of the locations for a long predetermined period of say three minutes, the individual units may not be restarted until a second shorter interval of time, such as thirty seconds, has elapsed, unless in the meantime the temperature in the regions of the several units has reached a predetermined level. Notwithstanding the temporary removal of the AC power from all of the units, the equipment nevertheless will supply power for the automatic control of the apartments or rooms or buildings at predetermined temperatures, such as 50 degrees, for a heating system. Thus, the arrangements will provide automatic shutdown for all of the several units while allowing random pickup or start up of any or all of the units, and, furthermore, after the equipment has been shut down, predetermined temperature conditions will be controlled and maintained at all times in the several units.

18 Claims, 2 Drawing Figures

FIG. I

INVENTOR.
GEORGE J. GRANIERI
BY Jefferson Ehrlich
ATTORNEY

CONTROL SYSTEM

This invention relates generally to systems for controlling and operating heating or air-conditioning systems or the like. This invention relates especially to systems for controlling and operating a plurality of heating or air-conditioning units so that they may be simultaneously turned off at a predetermined time, such as the end of the work day, and yet the systems will permit individual heating or air-conditioning units to be randomly turned on either manually or automatically during the so-called "turned off period."

The invention is especially applicable to control apparatus for heating or air-conditioning systems so that they may be relatively low in first cost and in maintenance cost and indeed less costly than electromechanical systems. The equipment of this invention will include solid state circuitry organized in relatively small packages of equipment which are easily handled and, moreover, the equipment should be capable of operating from power sources supplying a range of voltages, such as 208–277 vac or 178 –304 vac, and a range of frequencies such as 50 to 60 cps, without requiring adjustments in the field.

Earlier disclosures of quite different arrangements may be found in the Tucker et al. U.S. Pat. No. 3,037,364, issued June 5, 1962, the Tucker U.S. Pat. No. 3,306,348, issued Feb. 28, 1967, and the Smith U.S. Pat. No. 3,444,391, issued May 13, 1969, the latter patent being assigned to the assignee of the present application.

Figure 2:
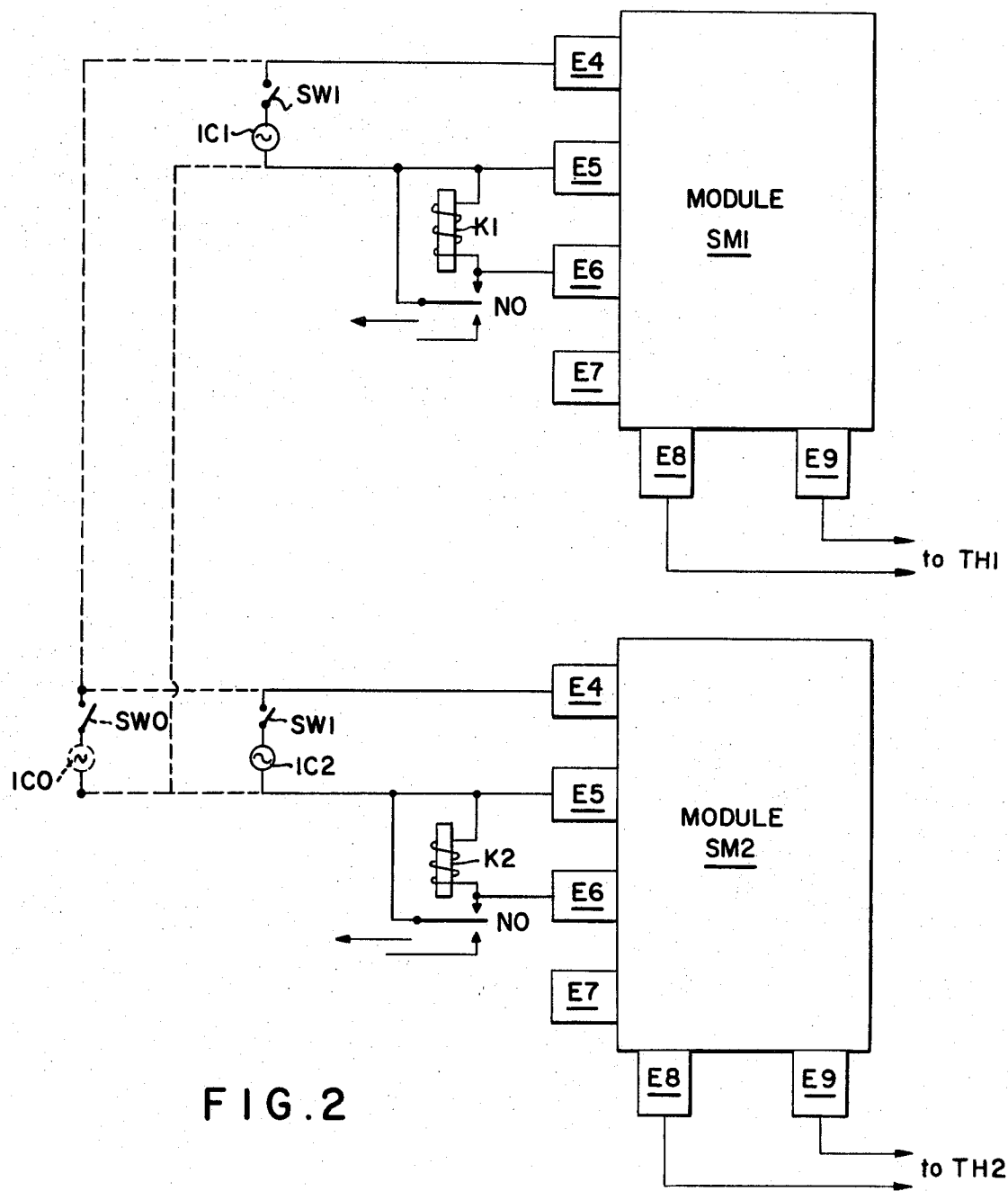

This invention, together with its various objects and features, will be better and more clearly understood from the following and more detailed description when read in connection with the accompanying drawing, in which FIG. 1 illustrates schematically one form of circuit arrangement for carrying out the principles of this invention, and FIG. 2 shows a schematical arrangement suitable for applying the invention to two of a plurality of separate control equipments. Throughout the drawing, the same or similar reference characters will be employed to designate the same or similar parts wherever they may occur in the drawing.

FIG. 1 of the drawing may be conveniently divided into five parts merely for ease of reference and description from time to time. These parts include (1) a DC power supply PDC, (2) a voltage limiter VL, (3) a timer circuit or time delay network (TDN), (4) a latching switch LS, and (5) an output stage OS.

Referring to FIG. 1 of the drawing, a main switch SW is shown connected to a source of voltage 1C which may be any AC source of voltage having a terminal voltage between about 178 volts and 304 volts and its frequency may vary between about 50 and 60 cps. When the switch SW is closed for enabling the system to operate, power will be supplied from the source IC through switch SW over a circuit which includes an electrolytic capacitor C1, resistor R1 and rectifier CR1. Capacitor C1 will be charged and this will result in a rise in the voltage across it. The capacitor C1 may be regarded as terminating the supply circuit PDC.

The capacitor C1 is connected to a Zener diode Z through a resistor R2. The Zener diode Z is shunted by a capacitor C2. The Zener diode Z will receive the voltage as rectified by the rectifier CR1 but, as is well known, the Zener diode Z will limit the maximum voltage to a value, such as 20 volts, across the circuit between the floating ground GD and terminal E4, and this voltage will be applied to the shunt capacitor C2. The capacitor C2 serves principally as an AC bypass for alternating current noise voltages to effectively remove those voltages.

The voltage across the circuit between terminal E4 and ground GD is bridged by the serially connected resistors R3 and R4, as shown, which are preferably equal resistors each of, for example, 100,000 ohms. Because of the relative equality of resistors R3 and R4, the respective voltages across these resistors are substantially equal to each other, or about 10 VDC each if the rectified voltage is 20 VDC. The voltage across resistor R4 will be applied through resistor R5 to the terminals A and K of the device Q1 which is preferably a so-called programmable unijunction transistor, otherwise called PUT. This voltage applied to terminals A and K of transistor Q1 must be greater than the voltage across resistor R8 to render the device Q1 conductive and, if not, transistor Q1 will remain non-conductive.

However, at the same time, the full voltage across the combination of resistors R3 and R4, or about 20 VDC, will be applied through resistor R8 and resistor R6 to capacitor C3. The capacitor C3 will eventually become charged to the full or total voltage between terminal E4 and ground GD. The diode CR3 shunting resistor R6 will aid in speeding up the charging current supplied to capacitor C3. Because of the presence of resistors R6 and R8 in series with capacitor C3, the voltage across capacitor C3 will rise as capacitor C3 charges. The voltage across resistor R8 will initially be at its maximum voltage and then fall off at an exponential rate dependent on the circuit constants, as will be apparent from the following description.

As the voltage across resistor R8 decreases, a critical voltage, such as 10 VDC, will be reached on resistor R8. This voltage is also applied to terminals G and K of transistor Q1 to overcome the non-conductive state of transistor Q1. When this happens, the transistor Q1 will become conducting. It is a feature of this invention that the transistor Q1 will become conducting in a critical pre-determined interval of time, such as, for example, about 30 seconds. This critical time interval may be designated T1. As will be observed, this time interval must elapse to start the operation of the equipment of FIG. 1 after switch SW has previously been opened for a long period of time, such as 3 minutes — and thereafter re-closed.

As soon as the transistor Q1 becomes conducting, a substantial positive pulse will be applied across resistor R5. The positive pulse across resistor R5 will then be applied over a path which includes resistor R7 and diode CR4 to the gate G of a silicon-controlled rectifier SCR (sometimes hereafter called Q2). This renders the device SCR conducting and this device will remain conducting even though the voltage applied to its gate G may subsequently fall off and indeed reach a zero level. The interconnecting circuit between resistor R7 and gate G of device SCR includes the capacitor C4 and resistor R10 in parallel with each other and the resistor R11 bridging the electrodes G and K of device SCR.

As soon as the device SCR becomes conducting, rectified current will be transmitted over a circuit established from terminal E4, the electrodes P and G of TRIAC Q3, resistor R13, the electrodes A and K of the SCR device and ground GD. This current through terminals A and K of the SCR device will render the TRIAC Q3 conducting. Its impedance will immediately drop to a very low or practically negligible value. When this happens, the full AC voltage of source IC will be transmitted through the switch SW, then through the terminals P and M of TRIAC Q3, then through the winding of relay K and back to the source IC. This AC voltage applied to the winding of relay K will transmit a current through that winding of sufficient magnitude to cause the relay to operate. This relay will remain operated, and is intended to remain operated, as long as the switch SW remains closed. The resistor R15 and capacitor C5, which bridge the device Q3, serve to limit the rate of rise of the voltage applied to TRIAC Q3.

The relay K closes a circuit (not shown in FIG. 1) to operate the heating units or the air-conditioning units or other units, whatever they may be, which are to be controlled by relay K, to couple those units to the POWER OUTPUT circuit. FIG. 2 schematically shows two independent units, which may be, for example, modules SM1 and SM2, both bridged in parallel with each other across the same input voltage source ICO through respective individual switching circuits, as shown, which are similar to the switching circuit of FIG. 1. Each of the switching circuits may include its own individual switch and power source, module SM1 having switch SW1 and power source IC1 and module SM2 having switch SW2 and power source IC2. In this arrangement, source ICO may feed both modules SM1 and SM2, or, when source ICO is disconnected, the individual power sources may be connected to the respective modules.

One of the primary features of the present circuit is the provision of the first time constant T1 developed by the equipment. A time constant of, for example, 30 seconds, or much longer if desired, can be developed by the present equipment.

The first time constant factor is primarily developed by the time delay network TDN. Here the more critical elements which influence the time delay factor include the capacitor C3, the transistor Q1 and the two resistors R3 and R4. Although shown as in series with each other across the path between terminal E4 and ground GD, the resistors R3 and R4 are in fact in a parallel arrangement when viewed from the terminal A of transistor Q1. By means of this connection, the total effective resistance of resistors R3 and R4 is about one-half the resistance of either resistor. By having the capacitor C3 connected to the gate terminal G of transistor Q1 instead of in the position of resistor R4, the current required by transistor Q1 to produce its timed switching effect to duly operate relay K is supplied by a low impedance source which is developed by resistors R3 and R4 connected in parallel with each other.

The parallel impedance of resistors R3 and R4, each of which may be about 100K Ω, is about 50K Ω. This lower impedance is much lower than the impedance of the resistor R8 which may be about 22 megohms. If the capacitor C3 has a capacitance of about 2 microfarads, then network R8–C3 will provide a fairly large delay or time constant of over 30 seconds. This delay determines the time required for the transistor Q1 to be converted or switched from a non-conductive state to a conductive state after switch SW becomes closed.

Another but much larger time constant T2 is supplied by the time delay network of TDN by resistor R6 and capacitor C3 essentially. If resistor R6 has an impedance of about 18 megohms, the combination of resistor R6 and capacitor C3 in conjunction with the low magnitude of holding current required to maintain transistor Q1 conducting will provide a time constant or delay of over 3 minutes. The discharge path of capacitor C3 includes resistor R6, resistor R3 and electrodes A and G of transistor Q1. This is another critical time factor T2 employed in the operation of the equipment of FIG. 1.

The single, rather simple network TDN provides two important time constants T1 and T2 for controlling the overall system.

Thus, after switch SW has been opened, the transistor Q1 will be held conductive for the long critical time factor T2, for example, 3 minutes, while switch SW remains open. In accordance with the present invention, no closure of switch SW during this three minute interval T2 while transistor Q1 continues conductive, with the switch SW open and remaining open, can cause relay K to become re-operated. The repeated closure of switch SW during this time interval will be of no avail. The time interval T2 may be readily adjusted by changing the constants of the delaying network, principally resistor R6 and capacitor C3.

Thus, in accordance with the present invention, the closure of the switch SW at, for example, the beginning of the work day, will cause the relay K to become operated after interval T1, as already described hereinabove, in response to the droppage in the impedance of the TRIAC Q3 to a negligible value. But after the switch SW is opened, relay K will be released and remain released. If switch SW is again closed, relay K may be re-operated but only if the switch SW remains re-closed after the expiration of the critical time interval T2, determined essentially by the magnitudes of the resistor R6 and the capacitor C3 (about 3 minutes). Should switch SW be re-closed before the elapse of the critical time interval T2, then Relay K will remain released and cannot be re-operated during that interval T2. This is primarily because transistor Q1 remains conductive throughout the critical time interval T2 of 3 minutes, so that there is insufficient pulse voltage established across resistor R5 when switch SW is closed during that interval. With insufficient voltage across resistor R5, the SCR device Q2 cannot become conductive and hence its impedance will remain very large. Under such conditions, the TRIAC Q3 will remain non-conductive and relay K cannot be operated.

During the critical three minute time interval T2, however, the SCR device Q2 becomes non-conductive almost as soon as switch SW is opened and, therefore, relay K will release almost as soon as switch SW is opened and remain released also during the smaller time interval T1.

The circuit of FIG. 1, therefore, introduces a number of protective features and unique operating features for a heating system of for a cooling or air-conditioning system or for any like arrangement. Some of these factors will now be briefly noted.

Relay K, which is the basic operating element for the various heating or air-conditioning units, cannot be re-operated by rapid intermittent closures of the switch SW. It is necessary to wait until the full time interval of the critical time period T2, such as 3 minutes, has passed before the switch SW may be re-operated to effectively re-operate relay K.

The thermostat TH1, which is connected through resistor R14 to the terminal common to resistors R12 and R13 and to the floating ground GD, and may be, for example, any bi-metallic switch which responds to temperature variations, provides another feature. At a predetermined temperature of, for example, 50° F., the thermostat TH1 will close the contact E8 and E9. When this happens, a path will be provided for the voltage developed across the Zener diode Z to establish sufficient current over the path of electrodes P and G of TRIAC Q3, then resistor R14 and thermostat TH1 to ground GD. Hence, TRIAC Q3 alone becomes conductive and readily allows sufficient current to flow through the winding of relay K to cause that relay to operate. Thus, a drop or a rise in the temperature to a predetermined value to operate the thermostat TH1 will bypass the delay network of the circuitry TDN and independently allow relay K to operate the respective heating or air-conditioning equipment, as the case may be. The thermostat TH1 may close at about 50° F and open at about 55° F.

The circuitry of FIG. 1 also includes a manually operated switch PB1 which provides another by-pass arrangement for the system. By closing switch PB1, the voltage across Zener diode Z will deliver a substantial current through the contacts of switch PB1, through resistor R9 and diode CR4 to the gate terminal G of the SCR device. This will cause the SCR device to become conductive. As already explained, when this device becomes conductive, TRIAC Q3 also becomes conductive, substantially reducing in impedance to a minimal or negligible value. Hence, relay K will again be operated to turn on the heating or air-conditioning or like equipment. Thus, by closing switch PB1, the relay K may be operated to operate the heating or air-conditioning equipment and this will occur independently of the protective delay factors which are particularly embodied in time delay network TDN.

The equipment of FIG. 2, for example, enables the operator, at a central location common to and controlling a plurality of units, to permit random start-up of all units merely by closing the switch SWO. This may be done at any time. Moreover, the arrangement permits all units to be shut down simultaneously by, for example, releasing switch SWO at the central location. Furthermore, the arrangement also provides for the restart or re-connection of each unit, but only after a definite time interval has elapsed after the switch SW has been opened and re-operated. Furthermore, if the unit is a heating unit, a minimum or higher temperature will be maintained at the unit after the central station has shut down the equipment by opening the switch SW and re-operating it. Likewise, if the unit is an air-conditioning unit, the temperature will be maintained at or below a maximum or predetermined temperature notwithstanding the shut down at the central location by the opening of the switch SW.

Each unit may have its own individual switch, such as SW1, and its own individual relay, such as K1. In the arrangement of FIG. 2, for example, the independent source of power IC1 and the switch SW1 may be connected to the respective terminals E4 and E5 and each relay winding will be connected between the respective terminals E5 and E6. Each relay, when operated, will control and operate the heating or air-conditioning equipment, and, when released, will control and release the respective equipment. Each relay may be regarded as a load device which may be employed to control the connection to the power source of the heating or air-conditioning equipments.

It will be clearly understood that the time intervals and the magnitudes of the various elements, which have been specified hereinabove, were given merely for illustration and explanation and these intervals and magnitudes may be adjusted and varied over wide ranges within the scope of this invention.

While this invention has been schematically shown and described in certain particular arrangements merely for illustration and explanation, it will be readily apparent that this invention may be applied to other and widely varied organizations to carry out the principles and features of this invention.

What is claimed is:

1. A control circuit comprising a source of rectified voltage, two substantially equal resistors connected in series with each other across said source, a third resistor, a capacitor, a fourth resistor of large magnitude connected in series with said capacitor and said third resistor across said source, a PUT device having gate, anode and cathode electrodes, the anode and cathode of said PUT device being connected across one of said equal resistors through a fifth resistor, the gate of said PUT device being connected to the terminal common to said capacitor and said fourth resistor, and a load operated in response to the PUT device becoming conductive.

2. A control circuit according to claim 1 having a diode bridging the third resistor.

3. A control circuit according to claim 2 having a zener diode bridged across the source of voltage.

4. A control circuit for a load comprising a source of rectified voltage, two substantially equal resistors connected in series with each other across said source, a delay circuit including a capacitor and third and fourth resistors connected in series with each other and bridged across said source, a PUT device having its anode and gate electrodes coupled between the terminal connecting said equal resistors and the terminal connecting said capacitor to said fourth resistor of said delay circuit, and means for operating the load and rendering the PUT device conductive, the release of said operating means rendering said PUT device nonconductive and preventing the load from being re-operated until the expiration of the delay interval determined by the delay circuit.

5. A control system for controlling the operation and re-operation of a load comprising, in addition to said load, a source of rectified voltage, a switch, a transistor, means responsive to the closure of said switch to render said transistor conductive and to operate said load, means responsive to the release and reclosure of said switch to re-operate said load, and means to prevent the re-operation of said load when the time interval between the release of said switch and its reclosure is shorter than a predetermined time interval, said prevention means including a capacitor and a resistor in series relationship with each other and connected to said transistor and providing said predetermined time interval to hold said transistor conductive during said time interval.

6. A control system according to claim 4 including a zener diode bridging said source of rectified voltage.

7. A control system according to claim 4 including means responsive to the ambient temperature reaching a predetermined value to operate said load.

8. A control system for controlling the operation and re-operation of a load comprising, in addition to said load, a source of rectified voltage, a switch, means responsive to the closure of said switch to operate said load, means responsive to the subsequent reclosure of said switch to re-operate said load, and means to prevent the re-operation of said load when the time interval between the release of said switch and its reclosure is shorter than a predetermined time interval, the prevention means including a PUT device, two substantially equal resistors connected in series with each other and bridging the source of voltage, the terminal common to said resistors being connected to the anode of the PUT device, two resistors connected respectively to the cathode and gate of said PUT device, and another resistor and a capacitor connected in series with each other to the gate of said PUT device to provide a circuit partially bridging the source of voltage.

9. A control system according to claim 8 including a diode bridging the resistor which is included in the circuit of the capacitor connected to the gate of the PUT device.

10. A control system comprising a source of rectified AC power, a load device, a switch to control the operation and release of said load device, solid state circuitry interconnecting said load device to said source of power through said switch, said solid state circuitry including a programmable unijunction transistor, means to render said transistor conductive in response to the closure of said switch, means to maintain said transistor conductive in response to the release of said switch for a predetermined time interval after the release of said switch, to prevent the re-operation of said load device by re-closure of said switch during said predetermined time interval, said means including a resistor and a capacitor connected in series with each other between said source of power and the gate of said transistor to fix said predetermined time interval.

11. A control system according to claim 10 including a voltage limiter bridging the source of power.

12. A control system according to claim 11 including means to by-pass said solid state circuitry and to operate the load device.

13. A control system according to claim 11 including means responsive to a predetermined temperature to operate the load device independently of said solid state circuitry.

14. A control system for supplying power from a source to a load comprising a switch which is to be actuated to supply power from said source to said load, a delay network interposed between said switch and said load and providing first and second time delay intervals, said delay network including a PUT device and means to render said PUT device conductive during said first delay interval and to prevent the re-operation of said load unless said switch remains open for a period which exceeds the second predetermined interval, said means of said delay network including a first resistor, a capacitor and a second resistor connected in series with each other across said source of power, the first resistor and the capacitor fixing the first time interval in which the PUT device becomes conductive and the second resistor and the capacitor fixing the second time interval.

15. A control system according to claim 14 in which the delay network is composed solely of solid state circuitry.

16. A control system for a load comprising a source of voltage, a switch, a network providing long and short delays, said network being connected between said load and said switch and including two resistors and a capacitor connected in series with each other, one of the resistors and the capacitor fixing one of the delays and the other resistor and the same capacitor fixing the other of said delays, means responsive to the operation of said switch to supply voltage from said source through said network to operate said load, means controlled by said network to prevent the re-operation of said load unless said switch remains operated longer than the interval of the long delay, and means responsive to the release and re-operation of said switch to re-operate said load provided the re-operation of said switch is performed after the release of said switch for an interval exceeding the longer delay.

17. A delay network comprising a bridge circuit, two substantially equal resistors forming two of the arms of the bridge circuit, a third resistor forming a third arm of the bridge circuit, a fourth resistor and a capacitor serially connected to each other to form the fourth arm of the bridge circuit, and a PUT device having three terminals, two of the terminals of said device being connected between the terminal common to the first and second arms and the terminal common to the third and fourth arms, the third terminal of said device being connected through a resistance to the terminal common to the second and third arms, the fourth resistor and said capacitor providing one delay network while the third resistor and said capacitor providing another delay network.

18. A delay network comprising a bridge circuit first and second substantially equal resistors forming two of the arms of the bridge circuit, a third resistor forming a third arm of the bridge circuit, a fourth resistor and a capacitor serially connected to each other to form the fourth arm of the bridge circuit, a PUT device having three terminals, two of the terminals of said device being connected between the terminal common to the first and second arms and the terminal common to the third and fourth arms, the third terminal of said device being connected through a resistor to the terminal common to the second and third resistors, and a diode bridging the resistor of the fourth arm of the bridge.

* * * * *

UNITED STATES PATENT OFFICE
CERTIFICATE OF CORRECTION

Patent No. 3,688,130    Dated August 29, 1972

Inventor(s) George J. Granieri

It is certified that error appears in the above-identified patent and that said Letters Patent are hereby corrected as shown below:

On the cover sheet insert -- [73] Assignee: American Standard Inc., New York, N.Y., a corporation of Delaware -- .

Signed and sealed this 8th day of May 1973.

(SEAL)
Attest:

EDWARD M. FLETCHER, JR.
Attesting Officer

ROBERT GOTTSCHALK
Commissioner of Patents